(12) United States Patent
Kusakabe et al.

(10) Patent No.: US 6,824,240 B2
(45) Date of Patent: Nov. 30, 2004

(54) IMAGE PROCESSING APPARATUS AND METHOD AND RECORDING MEDIUM

(75) Inventors: Minoru Kusakabe, Kanagawa (JP); Nobutaka Miyake, Kanagawa (JP); Kiyoshi Umeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 10/252,720

(22) Filed: Sep. 24, 2002

(65) Prior Publication Data

US 2003/0063144 A1 Apr. 3, 2003

(30) Foreign Application Priority Data

Sep. 28, 2001 (JP) .......................................... 2001/303663
Jun. 19, 2002 (JP) .......................................... 2002/178831

(51) Int. Cl.[7] ............................................... B41J 2/205
(52) U.S. Cl. ......................................... 347/15; 358/1.9
(58) Field of Search ...................... 347/15, 43; 358/1.2, 358/1.9, 501, 518, 521, 534; 382/232, 239, 240; 345/600

(56) References Cited

U.S. PATENT DOCUMENTS 5,751,929 A * 5/1998 Ohnuma et al. ............. 345/600
6,009,213 A 12/1999 Miyake ....................... 382/300

* cited by examiner

*Primary Examiner*—Lamson D. Nguyen
(74) *Attorney, Agent, or Firm*—Fitzpatrick, Cella, Harper & Scinto

(57) ABSTRACT

An input pixel value of input image data is converted to a pixel value within a predetermined range, and a pixel value of pixel of interest of the converted image is quantized for pseudo halftone representation, and a predetermined dot pattern is embedded to the quantized image data. In this manner, the predetermined dot pattern can be added to the input image data such that the predetermined dot pattern is inconspicuous or the degradation of the original image can be reduced.

16 Claims, 13 Drawing Sheets

0%

3%

10%

80%

87%

100%

10%

80%

10%

80%

IMAGE PROCESSING APPARATUS AND METHOD AND RECORDING MEDIUM

FIELD OF THE INVENTION

The present invention relates to image processing apparatus and method and recording medium for controlling positions of dots constructing image information in pseudo halftone representation.

BACKGROUND OF THE INVENTION

In recent years, an image in pseudo halftone representation is widely used upon printing by an ink-jet printer or the like. By virtue of high-speed computer processing and advanced printing technology, high-resolution and pseudo halftone multilevel representation have been achieved, and further, various schemes for pseudo halftone processing have been proposed.

In addition to the above-described improvements in quality of printed image, various purposes of image have been proposed. For example, proposed are schemes for embedding information (bits) different from an original image by e.g. adding a particular frequency component (dot pattern) to a particular region of image information or adding an image including a particular dot arrangement to the image information.

However, in the conventional art, in a low density region of pseudo-halftone processed image, the number of dots constructing the image region is extremely small. Accordingly, in such image region having a density equal to or less than a predetermined level, it is difficult to add an image including a particular frequency component in a manner the added image is inconspicuous by using the dots or form a particular dot arrangement.

On the other hand, in an image region of a density higher than the predetermined level, the number of dots constructing the image region is extremely large. Accordingly, a region to which dots can be newly added is limited, and it is difficult to add a dot pattern having a frequency component which can be extracted later to such image region or to form a particular dot arrangement. For example, in an ink-jet printer, as the size of dots to be added may increase in comparison with the resolution of image to which the dots are to be arranged, it is difficult to discriminate the added dots in an image region having a density equal to or greater than a predetermined level.

SUMMARY OF THE INVENTION

The present invention has been made in consideration of the above conventional art, and has its object to provide image processing apparatus and method and recording medium for dot arrangement control in image information in pseudo halftone representation while eliminating a density region where a predetermined dot pattern cannot be easily embedded.

Further, another object of the present invention is to provide image processing apparatus and method and recording medium for easily embedding a predetermined dot pattern in quantized image information by converting pixel values of the image information such that the pixel values stand within a predetermined range and then quantizing the image information.

In order to attain the above described objects, the image processing apparatus of the present invention comprises; pixel value conversion means for converting an input pixel value of input image information to a pixel value within a predetermined range; quantization means for quantizing the pixel value of a pixel of interest of the image information converted by the pixel value conversion means; and dot position control means for controlling a dot position of a dot formed by an image forming apparatus based on the image information quantized by the quantization means.

In order to attain the above described objects, the image processing apparatus of the present invention comprises; pixel value conversion means for converting an input pixel value of input image data to a pixel value within a predetermined range; quantization means for quantizing the pixel value of a pixel of interest of image data converted by the pixel value conversion means; and dot arrangement control means for controlling a dot arrangement for forming an image corresponding to the image data so as to form a predetermined dot pattern in the image data quantized by the quantization means.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
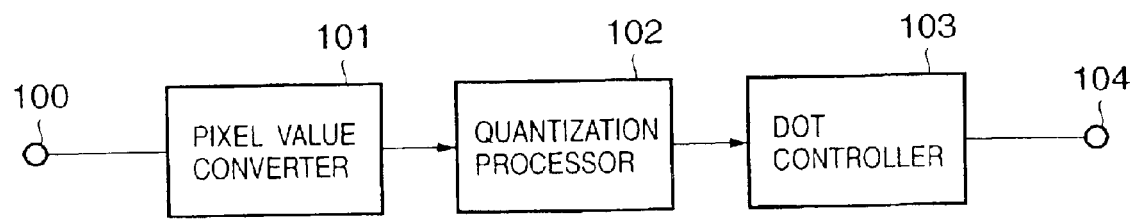
FIG. 1 is a block diagram showing principal constituent elements of image processing apparatus according to a first embodiment of the present invention.

FIG. 1 is a block diagram showing principal constituent elements of image processing apparatus according to a first embodiment of the present invention.

In FIG. 1, reference numeral 100 denotes an input terminal for inputting image information; numeral 101 denotes a pixel value converter which performs pixel value conversion to be described later; numeral 102 denotes a quantization processor which quantizes pixel values of image information for pseudo halftone representation of the image information where pixel values are converted by the pixel value converter 101; and numeral 103 denotes a dot controller which controls positions (pixel positions in image forming apparatus such as a printer or a display) of dots with non-zero pixel value to be formed or pixel values (quantized values), in the image information in pseudo halftone representation quantized by the quantization processor 102. That is, for example, the dot controller 103 controls positions of dots to be formed as shown in FIG. 3C so as to form a dot pattern as shown in FIG. 3I, which includes an image pattern as shown in FIG. 3G. Further, the dot controller 103 controls pixel values of the dots to be formed as shown in FIG. 3C or pixel values of the dots not to be formed in FIG. 3C, such that the dot pattern including a dot pattern as shown in FIG. 3G, is formed as shown in FIG. 3I. Note that the dot position control by the dot controller 103 may be performed by changing quantization condition by the quantization processor 102. In such case, the quantization processor 102 and the dot controller 103 can be integrated into one processor. Further, numeral 104 denotes an output terminal for outputting the above-processed image information.

Figure 2:
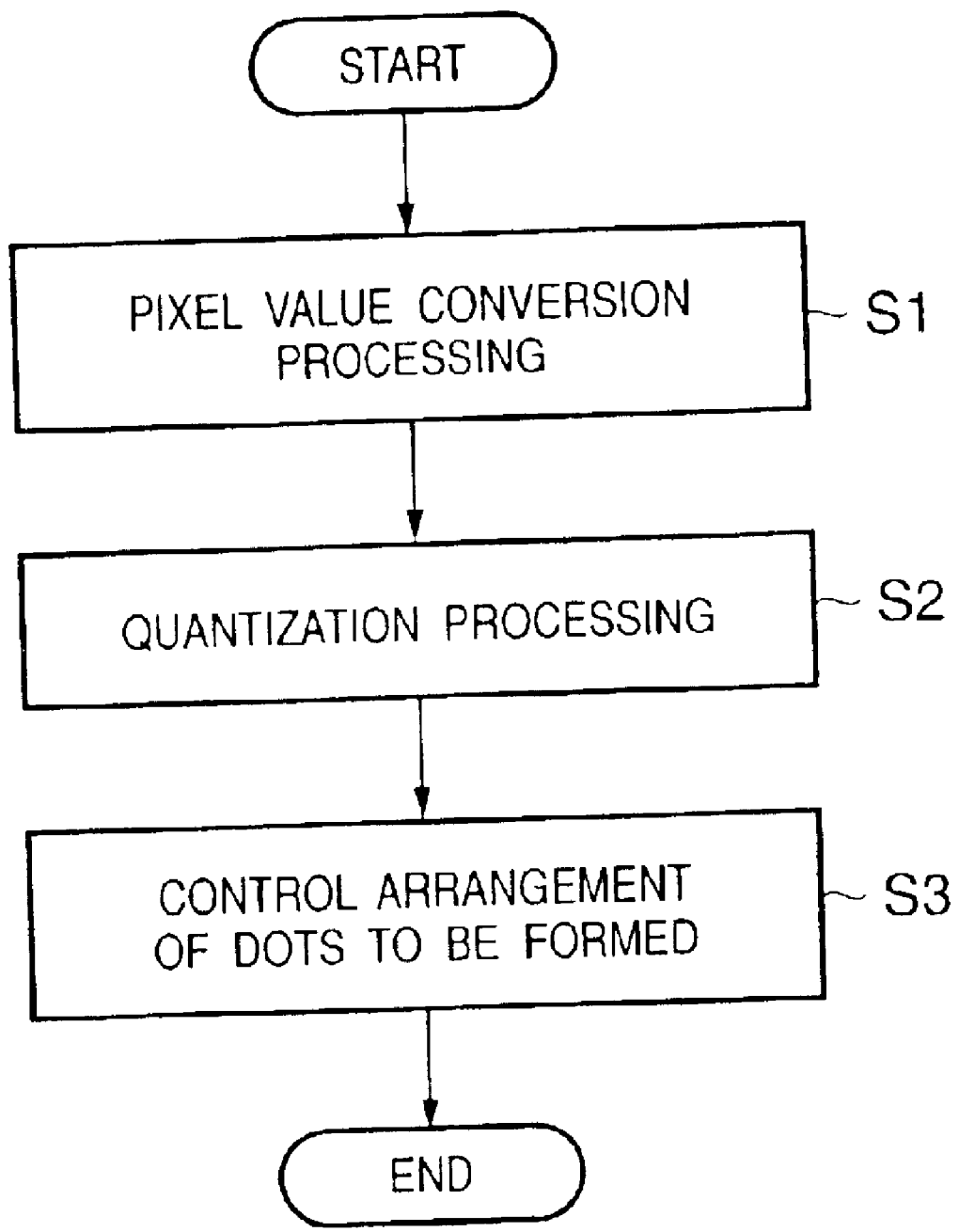
FIG. 2 is a flowchart showing an operation procedure according to the first embodiment.

FIG. 2 is a flowchart showing an operation procedure in the image processing apparatus in FIG. 1 according to the first embodiment.

When image information is inputted and processing is started, first, at step S1, pixel value conversion processing to be described later is performed by the pixel value converter 101. Next, at step S2, quantization processing is performed by the quantization processor 102 on respective pixels in the image information for pseudo halftone representation. The process proceeds to step S3, at which positions of dots (to be formed) having non-zero pixel values or pixel values in the pseudo-halftone image information are controlled by the dot controller 103, and then the process ends. Note that as described above, if dot control (S3) is possible upon quantization processing (S2), the processing at step S2 and that at step S3 can be integrated as one processing.

Next, the contents of the pixel value conversion processing (step S1) by the pixel value converter 101 will be described.

FIGS. 3A to 3L show examples of image information of several densities in pseudo halftone representation. Note that for the sake of simplification of explanation, binary quantization is performed in this embodiment, however, multi-level quantization may be performed.

Figure 3A:
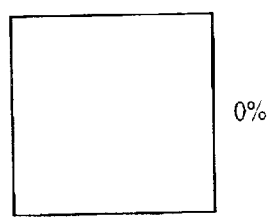
FIGS. 3A to 3L depict explanatory views of quantized image according to the first embodiment.
Figure 3B:
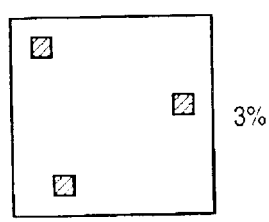
Figure 3C:
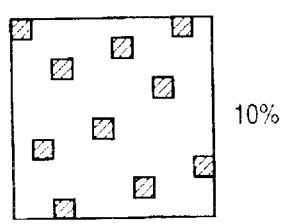
Figure 3D:
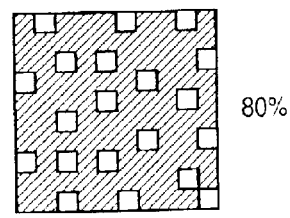
Figure 3E:
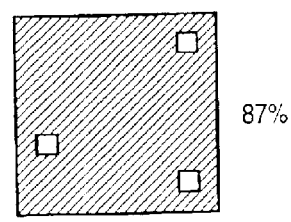
Figure 3F:
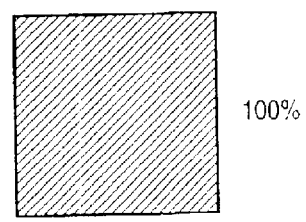
Figure 3G:
Figure 3H:
Figure 3I:
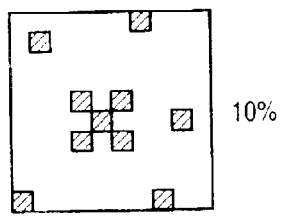

The images in FIGS. 3A to 3F and those in FIGS. 3I to 3L are respectively 10×10(pixels) images. FIGS. 3A to 3C show low-density (bright) images, and FIGS. 3D to 3F, high-density (dark) images. Further, a solid black portion represents an ON(1) pixel, and a white portion, an OFF(0) pixel.

In a case where a particular pattern (FIG. 3G) is formed within a predetermined range of image by the dot controller 103, in the low-density images in FIGS. 3A and 3B, the particular pattern (FIG. 3G) cannot be embedded in the images such that the pattern is inconspicuous unless dots irrelevant to the image density are newly generated. Similarly, in the high-density images in FIGS. 3E and 3F, as white portions of the particular pattern in FIG. 3G are too conspicuous if the particular pattern in FIG. 3G is embedded in the dot pattern shown in FIGS. 3E and 3F, the particular pattern (FIG. 3G) cannot be embedded in the images such that the pattern is inconspicuous.

Further, in a case where image information has a maximum frequency component with respect to a horizontal direction, a dot pattern as shown in FIG. 3H may be arranged as a pattern having a maximum frequency component with respect to the horizontal direction. However, in the low-density images in FIGS. 3A and 3B and the high-density images in FIGS. 3E and 3F, the pattern shown in FIG. 3H cannot be embedded as being inconspicuous in the images in FIGS. 3A, 3B, 3E and 3F, unless dots irrelevant to the image density are newly generated in the images in FIGS. 3A, 3B, 3E and 3F.

Figure 3K:
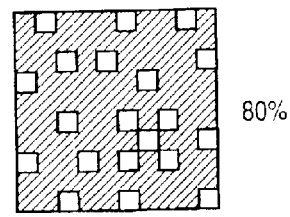
Figure 3J:
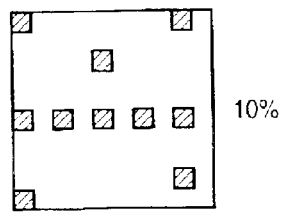

The above problem can be solved by limiting the range of pixel value used in the input image information to a predetermined range. For example, in FIGS. 3A to 3L, an image region having a density which will produce a quantization result as the low-density image in FIG. 3A or 3B is converted to an image having a density which will produce a quantization result as shown in FIG. 3C to obtain a desired effect. By the conversion, an image where the particular pattern as shown in FIG. 3G or 3H is embedded as shown in FIG. 3I or 3J can be formed. That is, FIG. 3I shows an image where the particular pattern in FIG. 3G is embedded, and FIG. 3J, an image where the particular pattern in FIG. 3H is embedded.

Figure 3L:
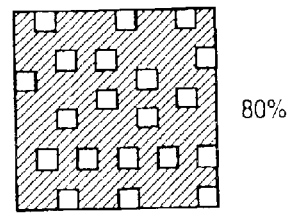

Similarly, image information which will produce a quantization result as the high-density image in FIG. 3E or 3F is converted to an image which will produce a quantization result as shown in FIG. 3D. By the conversion, an image where the particular pattern as shown in FIG. 3G or 3H is embedded as shown in FIG. 3K or 3L can be formed. That is, FIG. 3K shows an image where a reverse pattern of the particular pattern in FIG. 3G is embedded, and FIG. 3L, an image where the particular pattern in FIG. 3H is embedded.

Note that the advantages of the first embodiment are not only obtained in images having densities as shown in FIGS. 3A to 3L or quantization results but also obtained in other various densities or image regions as quantization results.

Further, the control performed by the dot controller 103 is not limited to embedding of particular pattern as shown in FIG. 3G or 3H or forming an image having a maximum frequency component but other various dot controls may be performed. Further, in case of multilevel quantization, in addition to moving of non-zero value pixel positions, correction of quantization values may be performed for prevention of change in image density.

Figure 4:
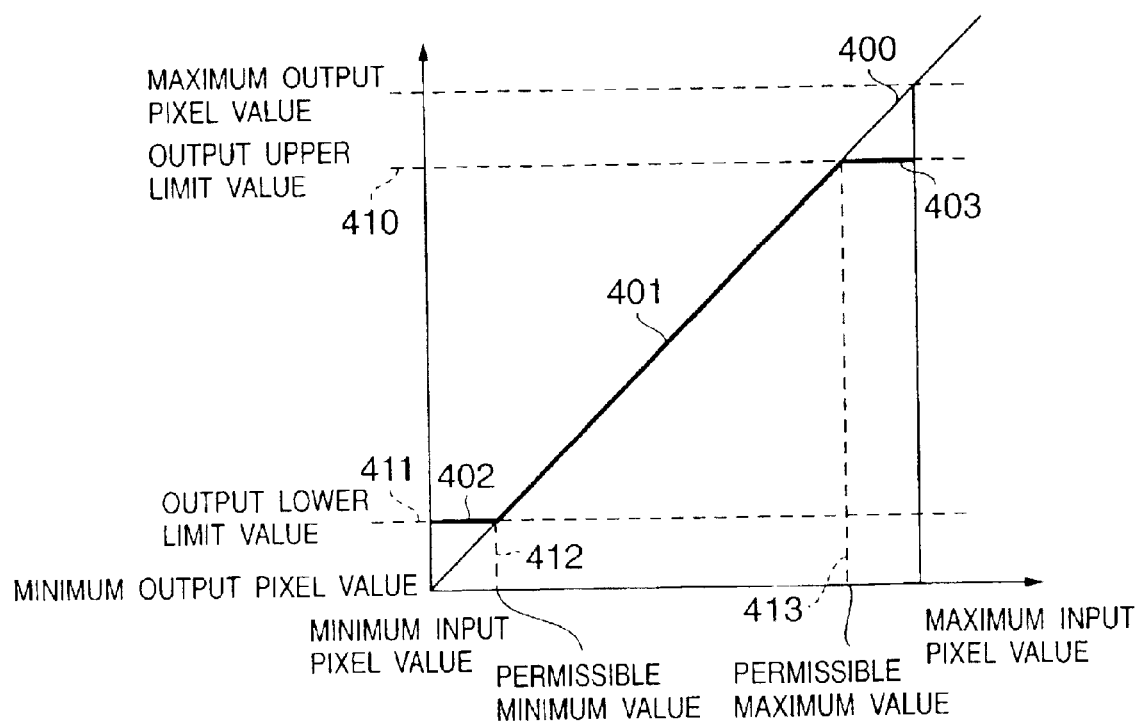
FIG. 4 depicts a graph explaining pixel value conversion according to the first embodiment.

FIG. 4 is a graph explaining pixel value conversion processing (step S1) by the pixel value converter 101 according to the first embodiment.

In FIG. 4, the horizontal axis indicates an input pixel value and the vertical axis, an output pixel value. Note that generally minimum input pixel value and minimum output pixel value are "0". On the other hand, maximum input pixel value and maximum output pixel value are, in case of image in respectively 8-bit representation, for example, "255". Note that the first embodiment is not limited to the above image representation, and further, the maximum input pixel value and the maximum output pixel value are not always the same. Next, upper limit and lower limit on the output pixel value axis are pixel values to obtain sufficient effect of pixel control as described above. These limit values are previously determined in correspondence with image density, quantization result and pixel control.

In FIG. 4, a line 400 shows the relation between the input pixel value and output pixel value that the minimum input pixel value becomes the minimum output pixel value and the maximum input pixel value corresponds to the maximum output pixel value, and further, outputs corresponding to pixel values between the minimum input pixel value and the maximum input pixel value linearly complement the minimum output pixel value and the maximum output pixel value.

In the present embodiment, pixel values of input image must be converted to pixel values within the range defined by an output upper limit value 410 and an output lower limit value 411. Accordingly, the input pixel values within the range defined by a permissible minimum value (412) and a permissible maximum value (413) are converted to output pixel values in accordance with a bold solid line along the line 400. In the conversion based on the relation of the line 400, an input pixel value corresponding an output value less than the output lower limit value 411 (value equal to or less than the permissible minimum value 412) is converted to the lower limit value 411 as indicated by a line 402. Similarly, in the conversion based on the relation of the line 400, an input pixel value corresponding to an output value greater than the output upper limit value 410 (value equal to or greater than the permissible maximum value 413) is converted to the upper limit value 410 as indicated by a line 403.

In a case where original image information represents a color image, the conversion shown in FIG. 4 may be performed by each color constructing the image. In such case, the output upper limit value 410 and the output lower limit value 411 are not necessarily the same for each color but optimum values for each color may be used in correspondence with processing system.

Further, in case of color image, the impression of original image can be prevented from being changed by determining these output upper limit value and output lower limit value, such that combined colors of converted pixel values less than the output lower limit value 411 or greater than the upper limit value 410 become achromatic.

Further, the conversion is not necessarily performed within the range defined by the output lower limit value 411 and the output upper limit value 410. For example, if the output lower limit value 411 is unnecessary, conversion may be performed along the line 400 in place of processing indicated by the line 402 in FIG. 4. Similarly, if the output upper limit value 410 is unnecessary, conversion may be performed along the line 400 in place of processing indicated by the line 403 in FIG. 4.

Figure 5:
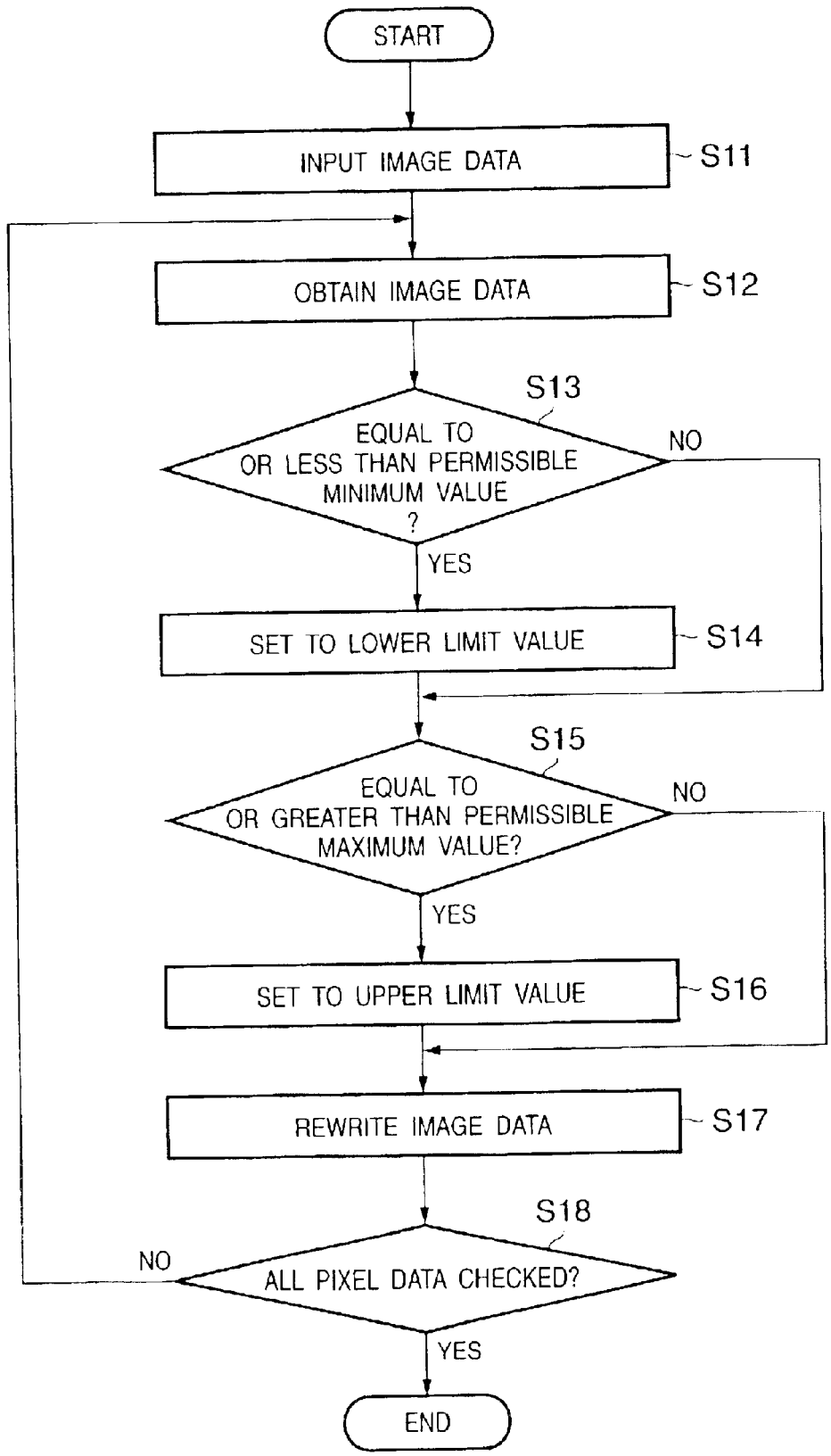
FIG. 5 is a flowchart showing the pixel value conversion according to the first embodiment.

FIG. 5 is a flowchart showing the pixel value conversion processing (S1) by the pixel value converter 101 according to the first embodiment.

First, at step S11, multivalue image data is inputted. Next, at step S12, the pixel data of the image data is obtained. At step S13, it is determined whether or not the value (pixel value) of the pixel data is equal to or less than the permissible minimum value 412. If the pixel value is not equal to or less than the permissible minimum value 412, the process proceeds to step S15, otherwise, proceeds to step S14, at which the pixel value is set to the output lower limit value 411 in FIG. 4 (402 in FIG. 4). Next, at step S15, it is determined whether or not the pixel value of the pixel data is equal to or greater than the permissible maximum value 413. If the pixel value is not equal to or greater than the permissible maximum value, the process proceeds to step S17, otherwise, proceeds to step S16, at which the pixel value is set to the output upper limit value 410 in FIG. 4 (403 in FIG. 4). At step S17, the pixel data is rewritten in the initial pixel position, thereby the pixel data is updated. By this processing, as described in FIG. 4, the input pixel value equal to or less than the permissible minimum value 412 is converted to the output lower limit value 411 while the input pixel value equal to or greater than the permissible maximum value 413 is converted to the output upper limit value 410 and stored in the initial pixel data position. Note that other pixel data are not converted. Thus, the process proceeds to step S18, and the processing from step S12 to S17 is repeatedly performed until it is determined that all the pixels of the image data have been processed.

As described above, according to the first embodiment, by dot position control by the dot controller 103, an image density region where a predetermined pattern cannot be embedded can be eliminated. As a result, the effect of the dot position control in pseudo-halftone image information can be obtained in any region of the image information in a stable manner.

[Second Embodiment]

The above first embodiment has been described as preferred implementation based on the basic construction of the present invention. However, as the pixel value conversion by the pixel value converter 101 (step S1), other preferred methods than the conversion in FIG. 4 described in the first embodiment can be provided.

In the second embodiment, in a similar construction to that of the first embodiment, further preferred implementation of the pixel value conversion will be described as pixel value conversion method applicable to the pixel value conversion processing (step S1) by the pixel value converter 101. Note that the explanations of the items, terms and the like used in the previous description will be omitted as long as they are not particularly changed.

In the pixel value conversion shown in FIG. 4 of the first embodiment, pixel values less than the permissible minimum value 412 and greater than the permissible maximum value 413 are converted to particular values, whereas in the pixel value conversion according to the second embodiment, the pixel values are converted without pixel value range where tonality is lost, i.e., the linearity of the output pixel data is maintained.

Figure 6:
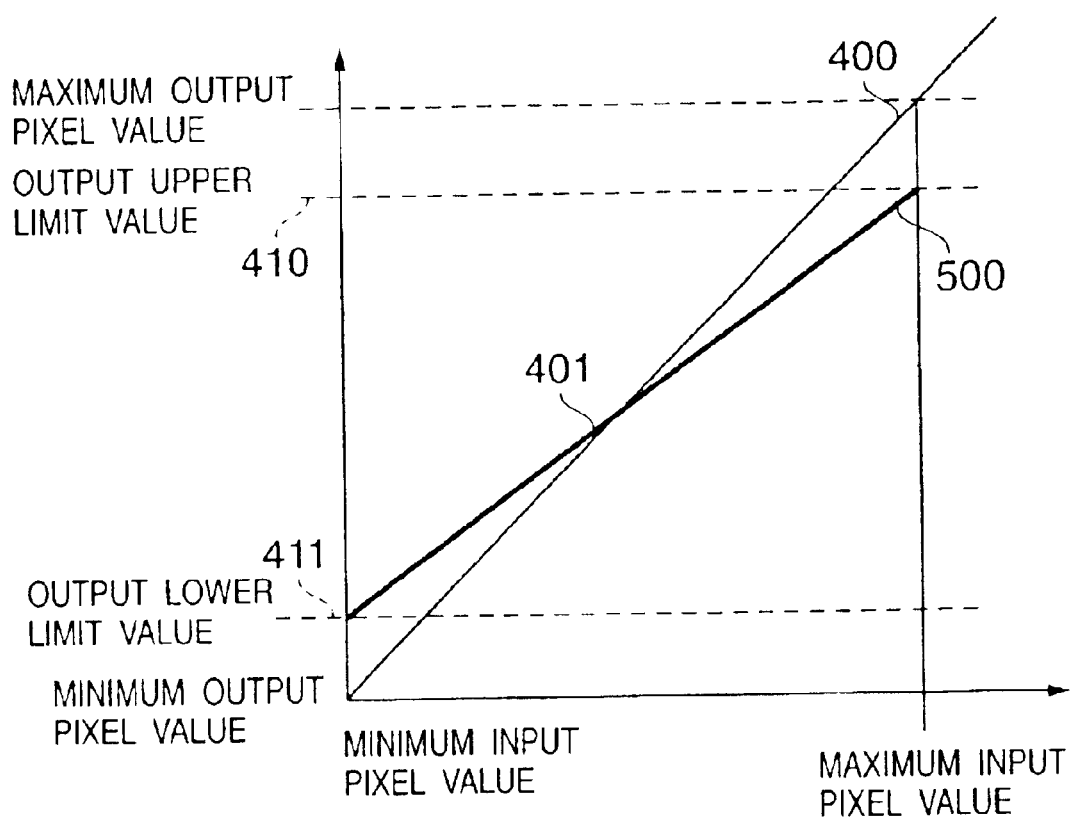
FIG. 6 depicts a graph explaining the pixel value conversion according to a second embodiment of the present invention.

FIG. 6 is a graph explaining the pixel value conversion processing (S1) by the pixel value converter 101 according to the second embodiment of the present invention.

In FIG. 6, an output value corresponding to the minimum input pixel value (generally "0") becomes the output lower limit value 411, and an output value corresponding to the maximum input pixel value (e.g. "255" in 8-bit pixel value) becomes the output upper limit value 410. Further, an output value corresponding to an input pixel value within the range between the minimum input pixel value and the maximum input pixel value is converted to a value indicated by a straight line 500 connecting an output value corresponding to the minimum input pixel value and that corresponding to the maximum input pixel value.

Figure 7:
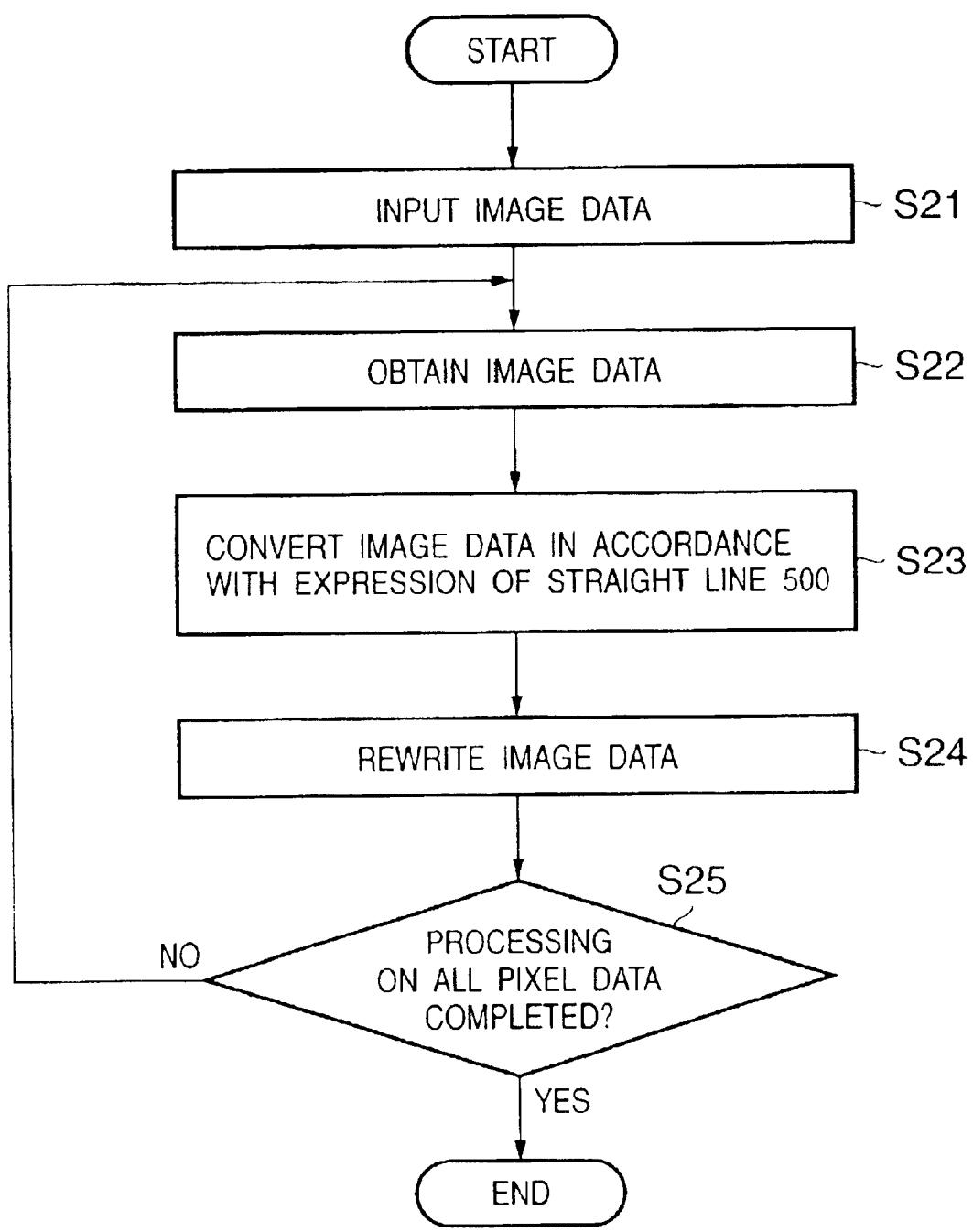
FIG. 7 is a flowchart showing the pixel value conversion according to the second embodiment.

FIG. 7 is a flowchart showing the pixel value conversion processing (S1) according to the second embodiment.

First, at step S21, multivalue image data is inputted. Next, at step S22, the pixel data of the image data is obtained. Then at step S23, the pixel data is substituted into "x" of expression of the straight line 500 in FIG. 6, ($y=\alpha x+\beta$) to calculate the value of y (output pixel value). Note that in the expression, "$\beta$" corresponds to the output lower limit value 411 and expressed as $\alpha=$(output upper limit value-$\beta$)/255(in case of 8-bit pixel value). The output pixel value is obtained in this manner, then the process proceeds to step S24, at which the output pixel value is rewritten in the initial pixel data position. As described in FIG. 6, the input pixel value becomes the output pixel value converted by conversion along the straight line 500. The process proceeds to step S25, and the processing from step S22 to S24 is repeatedly performed until it is determined that all the pixels of the image data have been processed. Note that at step S23, it may be arranged such that a look-up table holding linear conversion data is provided, and an input pixel value is inputted into the table to obtain the output pixel value in place of calculation by the above expression.

As described above, according to the second embodiment, as an input pixel value between the minimum input pixel value and the maximum input pixel value becomes an linearly-converted output pixel value, the occurrence of pixel value range where tonality of original image is lost can be prevented, and the control by the dot controller 103 can be easily performed without occurrence of unavailable image density region.

[Third Embodiment]

Also in this embodiment, in a similar construction to that of the first embodiment, another preferred method applicable to the pixel value conversion processing (S1) by the pixel value converter 101 will be described. Note that the explanations of the items, terms and the like used in the above description will be omitted as long as they are not particularly changed.

The pixel value conversion processing according to the third embodiment suppresses change in original image as much as possible while preventing occurrence of pixel value range where tonality is lost.

Figure 8:
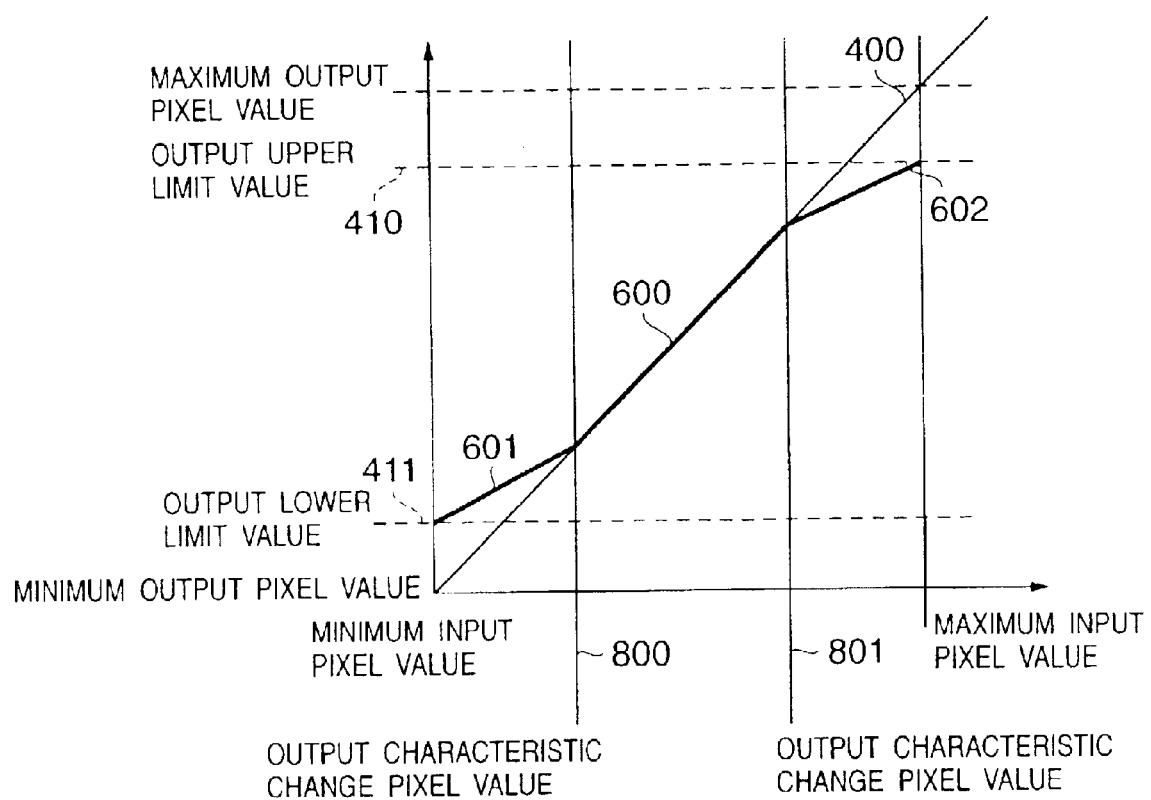
FIG. 8 depicts a graph explaining the pixel value conversion according to a third embodiment of the present invention.

FIG. 8 is a graph explaining the pixel value conversion processing (S1) by the pixel value converter 101 according to the third embodiment of the present invention.

In FIG. 8, the minimum input pixel value corresponds to the output lower limit value 411, and the maximum input pixel value corresponds to the output upper limit value 410. Further, the relation for conversion is divided into plural sections, and for at least suppression of change of original image, an input pixel value is converted to an output pixel value along a straight line 600 within a range defined by output characteristic change pixel values 800 and 801. Further, an input pixel value between the output characteristic change pixel value 800 and the minimum input pixel value (0) is converted along a straight line 601. Further, an input pixel value between the output characteristic change pixel value 801 and the maximum input pixel value (255 for 8-bit) is converted along a straight line 602.

Note that in FIG. 8, the conversion section is divided into three sections, however, it may be arranged such that a further conversion section is provided between the straight lines 600 and 601 or between the straight lines 600 and 602 so as to define conversion characteristic therebetween. In this case, a further smooth output pixel characteristic can be obtained.

Further, conversion is not necessarily performed with both of the output lower limit value and output upper limit value. If the output lower limit value is not necessary, the conversion characteristic may be defined by the line 400 in place of the straight line 601, and similarly, if the output upper limit value is not necessary, the conversion characteristic may be defined by the line 400 in place of the straight line 602.

Figure 9:
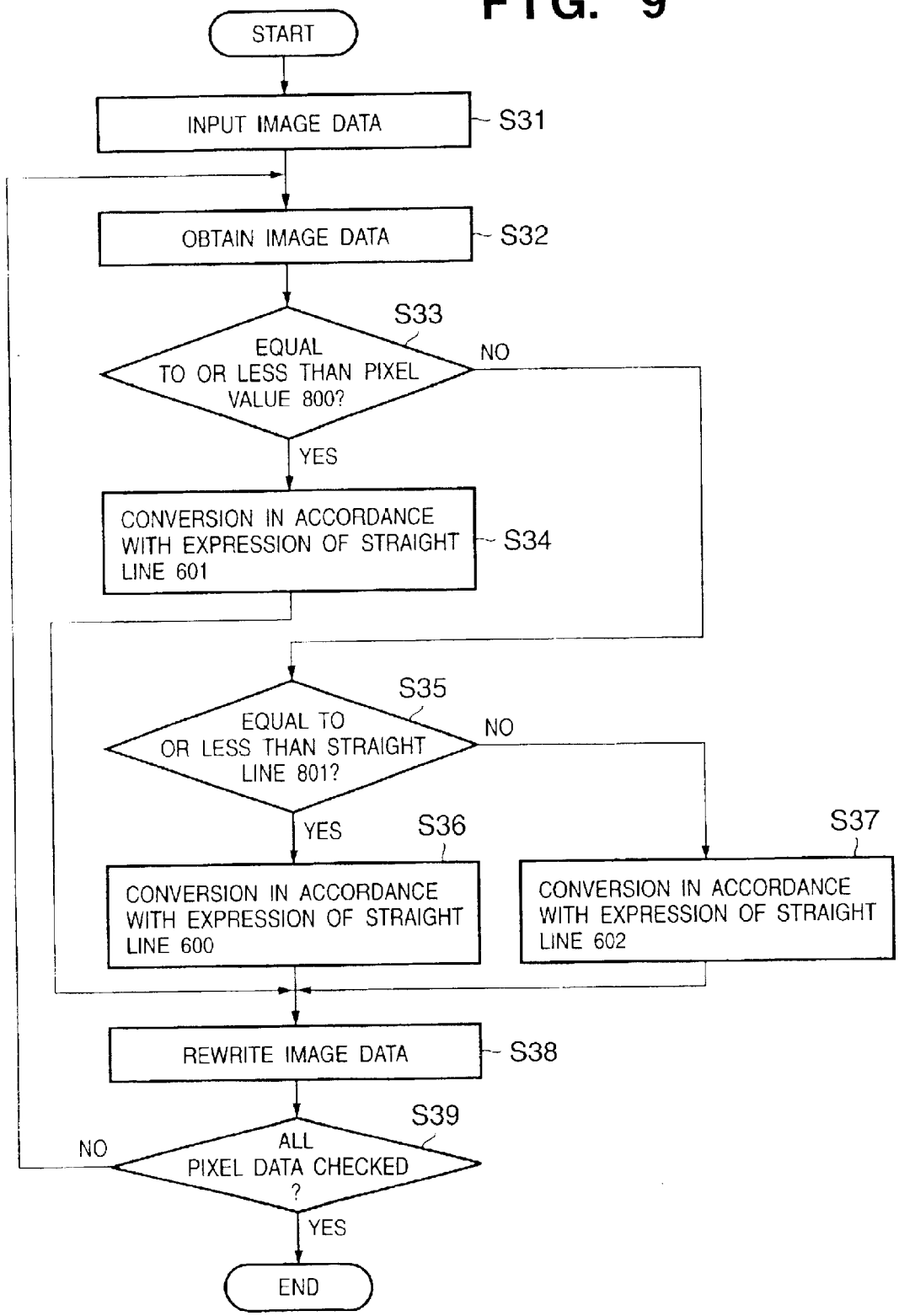
FIG. 9 is a flowchart showing the pixel value conversion according to the third embodiment.

FIG. 9 is a flowchart showing the pixel value conversion processing (S1) according to the third embodiment.

First, at step S31, multivalue image data is inputted. Next, at step S32, the pixel data of the image data is obtained. Then at step S33, it is determined whether or not the pixel value is equal to or less than the pixel value 800 in FIG. 8. If the pixel value is not equal to or less than the pixel value 800, the process proceeds to step S35, otherwise, proceeds to step S34, at which the pixel value is converted based on the straight line 601. As in the case of the step S23 in FIG. 7, the input pixel value is substituted into "x" of the expression of the straight line y=αx+β. This calculation is also adopted at steps S36 and S37 to be described later. The process proceeds from step S34 to step S38. Note that as in the case of FIG. 7, it may be arranged such that a look-up table holding conversion data corresponding to the respective straight lines is provided to obtain an output pixel value.

At step S35, it is determined whether or not the pixel value is equal to or less than the pixel value 801. If the pixel value is not equal to or less than the pixel value, the process proceeds to step S37 at which the pixel value is converted based on the expression of the straight line 602. On the other hand, if the pixel value is equal to or less than the pixel value 801, the process proceeds to step S36, at which the pixel value is converted based on the straight line 600. Thus the process proceeds through step S34, S36 or S37 to step S38, at which the pixel data is rewritten into the initial pixel data position. By this processing, the input pixel value is converted based on one of the different characteristics in the three ranges of input pixel value to the output pixel value, and stored in the initial pixel data position of the image data. Thus, the process proceeds to step S39, and the processing from step S32 to S38 is repeatedly performed until it is determined that all the pixels of the image data have been processed.

As described above, according to the third embodiment, the occurrence of pixel value range where tonality of original image is lost can be prevented, and the control by the dot controller 103 can be easily performed without occurrence of unavailable image density region.

[Fourth Embodiment]

In the fourth embodiment, in a similar construction to that of the first embodiment, another preferred method applicable to the pixel value conversion processing (S1) by the pixel value converter 101 will be described. Note that the explanations of the items, terms and the like used in the above description will be omitted as long as they are not particularly changed. In the pixel value conversion processing of the present embodiment, nonlinear input/output relation is employed.

Figure 10:
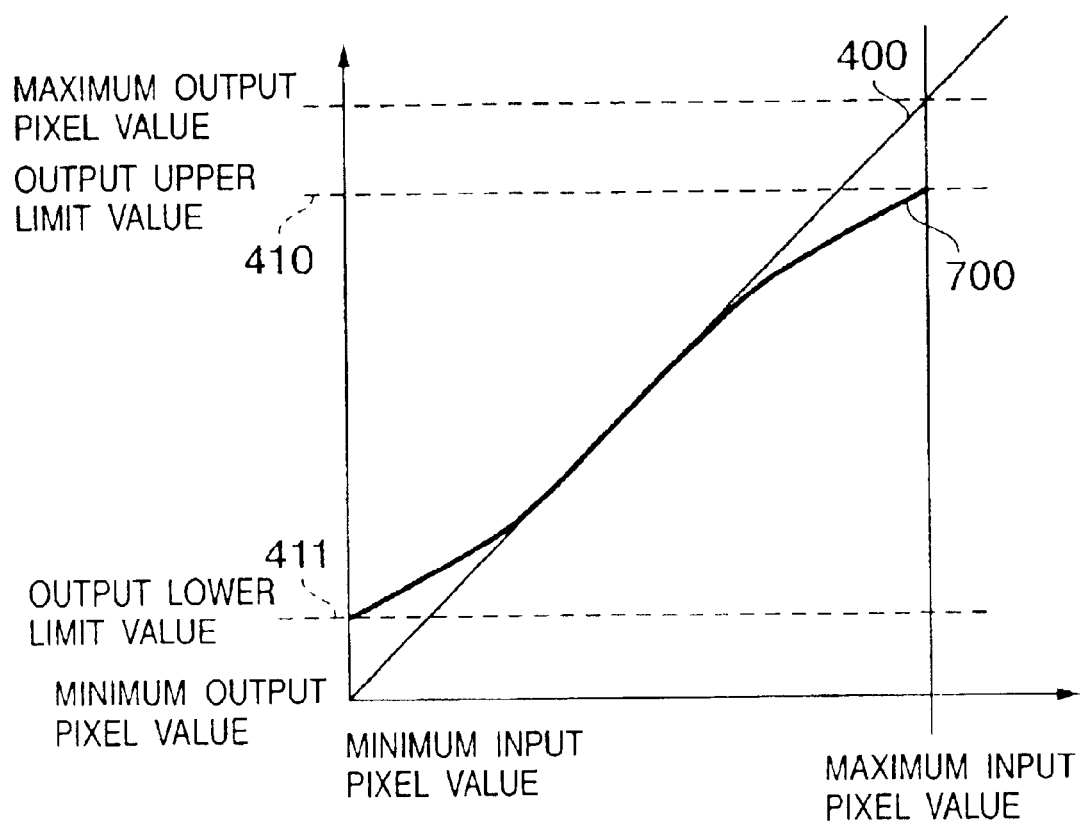
FIG. 10 depicts a graph explaining the pixel value conversion according to a fourth embodiment of the present invention.

FIG. 10 is a graph explaining the pixel value conversion processing (S1) by the pixel value converter 101 according to the fourth embodiment of the present invention.

In FIG. 10, the minimum input pixel value corresponds to the output lower limit value 411, and the maximum input pixel value, to the output upper limit value 410. Further, the input/output relation to a pixel value between the minimum input pixel value and the maximum input pixel value is non linear as indicated by a curve 700. Note that the conversion processing may be performed by using any approximate curve as the non linear relation or referring to a table holding the input/output relation.

In this case, at step S23 in the flowchart of FIG. 7 according to the second embodiment, the input pixel value is converted by using the expression of the curve 700 in place of the expression of the straight line 500. Otherwise, at step S23, the input pixel value may be converted to the output pixel value by using the conversion table.

Further, as in the case of the third embodiment, regarding around an intermediate input value, it is desirable that the conversion relation is close to the line 400 as much as possible. Accordingly, it may be arranged such that the conversion relation is divided into plural sections as in the case of the third embodiment, and around the minimum input pixel value and the maximum input pixel value, the non linear relation is employed, while around the intermediate input pixel value, the linear relation may be employed. Further, in this case, it is preferable that the conversion on the line 400 is employed in the liner relation section.

Further, in case of color image, the conversion method may be changed in a color component. In this case, one of the pixel value conversion methods described in the above first to fourth embodiments may be selected by a color component.

As described above, according to the fourth embodiment, the occurrence of pixel value range where tonality of original image is lost can be prevented, and the control by the dot controller 103 can be easily performed without occurrence of unavailable image density region.

[Fifth Embodiment]

In this embodiment, a more particular example where the invention is applied to image processing performed by a printer driver will be described. Note that the items used in the description of the embodiments have the same reference numerals and the explanations thereof will be omitted.

Figure 11A:
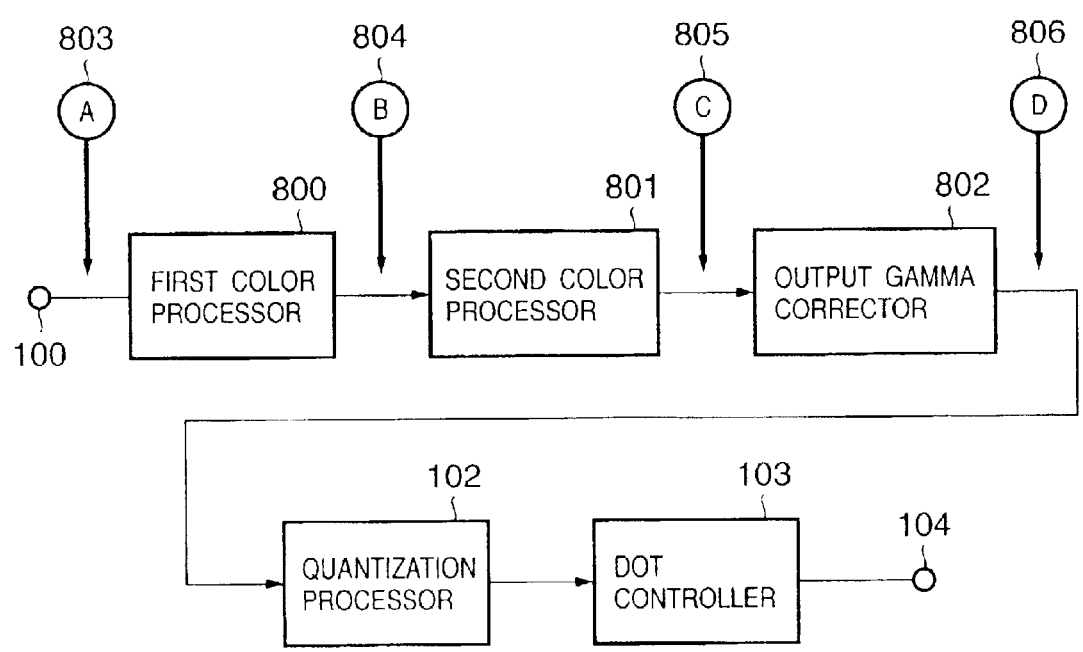
FIGS. 11A and 11B depict block diagrams showing principal constituent elements of the image processing apparatus according to a fifth embodiment of the present invention.
Figure 11B:
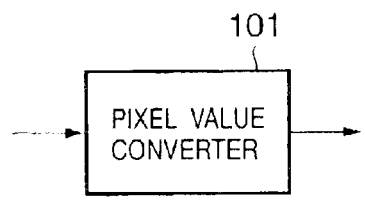

FIGS. 11A and 11B are block diagrams showing principal constituent elements of the image processing apparatus according to the fifth embodiment of the present invention.

In FIG. 11A, numeral 800 denotes a first color processor which converts a display-reproducible color range into a printer-reproducible color range; numeral 801 denotes a second color processor which performs image formation color conversion (e.g., conversion from RGB to CMYK); numeral 802 denotes an output gamma corrector which performs correction to smooth a tonality characteristic of output image from the second color processor 801. At any one of stages A (803), B (804), C (805) and D (806), the above-described pixel value converter 101 in FIG. 11B is inserted. Further, in FIG. 11A, image information inputted from the input terminal 100 is inputted, through the processing by the color processors 800 and 801 and the pixel value converter 101 inserted into any one of the stages A (803), B (804), C (805) and D (806), into the quantization processor 102. The quantization processor 102 performs quantization on the respective pixels of the image information by an organized dither or error-diffusion method. Then the pixel data outputted from the quantization processor 102 is outputted, through the above-described dot controller 103, from the output terminal 104.

Figure 12A:
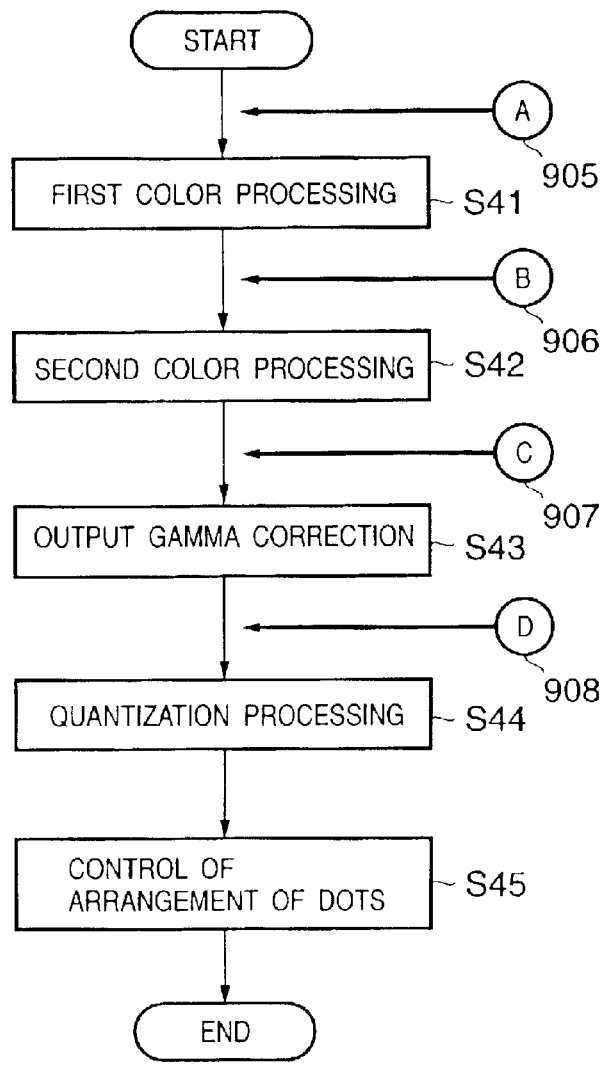
FIGS. 12A and 12B are flowcharts showing the pixel value conversion according to the fifth embodiment.
Figure 12B:
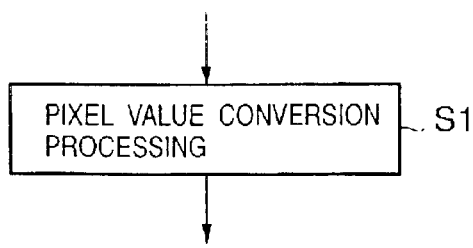

FIGS. 12A and 12B are flowcharts showing the pixel value conversion according to the fifth embodiment. Note that in FIG. 12A, the processing procedure in FIG. 12B performed by the pixel value converter 101 will be described later, and the procedure of other items will be described first.

In FIG. 12A, when the process is started, first, at step S41, the color processing is performed by the first color processor 800. Then at step S42, the color processing is performed by the second color processor 801. Next, at step S43, the color correction processing is performed by the output gamma corrector 802, then at step S44, the quantization processing is performed by the quantization processor 201. The process proceeds to step S45, at which output dot control is performed by the dot controller 103, and the process ends.

The pixel value conversion processing (S1) in FIG. 12B is performed in any one of stages A (905), B (906), C (907) and D (908) in FIG. 12A. Note that the alphabets A to D correspond to those in FIG. 11A. Further, the conversion methods as described in the above first to fourth embodiments are applicable to the contents of the pixel value conversion processing (S1). Note that in the fifth embodiment, it is preferable that the above output upper limit value and the output lower limit value are previously determined in correspondence with the result of printing.

Next, advantages of the pixel value converter 101 and the pixel value conversion processing (S1) in insertion positions A to D will be described with reference to FIGS. 11A and 11B and FIGS. 12A and 12B. Note that the insertion positions A and B correspond to a status where the image information is represented in display colors to the display, while the insertion positions C and D correspond to a status where the image information is represented in print colors to the printer.

First, if the pixel value converter 101 and the pixel value conversion processing (S1) are inserted into the insertion position A, as the conversion is performed on the image in display colors to the display, the change caused in the converted image can be easily checked on the display. Further, this advantage is also obtained in the insertion position B. Although the conversion is performed on the image having a post-printing color reproduction range, as the image is in display colors to the display, the change caused in the converted image can be easily checked on the display.

Next, if the pixel value converter 101 and the pixel value conversion processing (S1) are inserted into the insertion position C and D, the image is in print colors in the printer. In the printer which prints the image by using ink, toner or the like, as the pixel value conversion processing is performed on the image in print colors for actual image printing, the pixel value conversion processing can be performed in correspondence with colors of printing method and image formation.

Note that in a case where the first color processing (S41), the second color processing (S42) or the output gamma correction (S43) is performed by referring to a previously-generated table, the pixel value converter 101 and the pixel value conversion processing (S1) can be omitted by generating the table such that the table includes the pixel value conversion processing (S1).

Note that the above processing has been described as processing by a printer driver, however, if possible, a part or entire processing may be performed by an application program. Especially, in a case where the pixel value converter 101 and the pixel value conversion processing (S1) are inserted into the insertion position A, if the processing to the insertion position A is performed by the application, the processing can be performed without changing the printer driver.

As described above, according to the fifth embodiment, an image density region, where the dot arrangement control by the dot controller 103 is difficult, can be eliminated from an image on a printed matter obtained by utilizing a printer. As a result, the advantages of dot position control on pseudo-half-tone image information can be obtained in any of image information region in a stable manner.

[Sixth Embodiment]

In this embodiment, the above-described fifth embodiment is further developed. Note that the items used in the description of the above embodiments have the same reference numerals and the explanations thereof will be omitted.

Figure 13A:
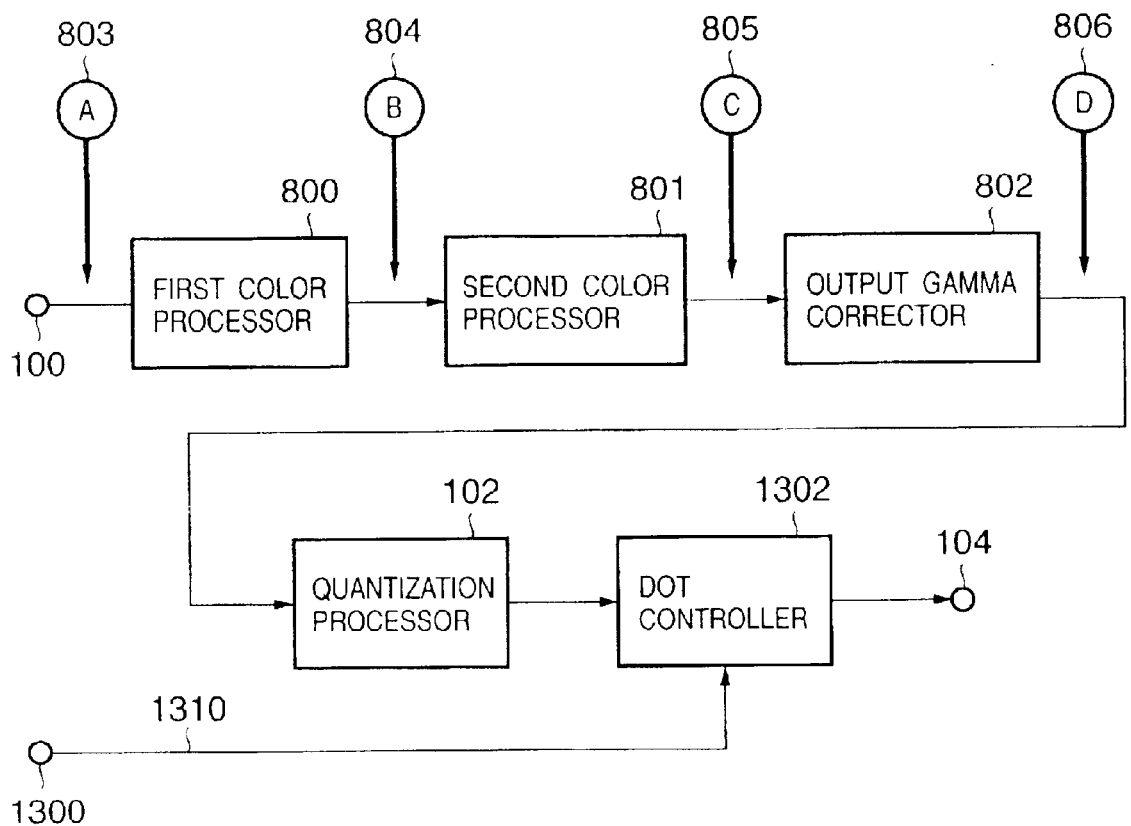
FIGS. 13A and 13B depict block diagrams showing principal constituent elements of the image processing apparatus according to a sixth embodiment of the present invention.
Figure 13B:
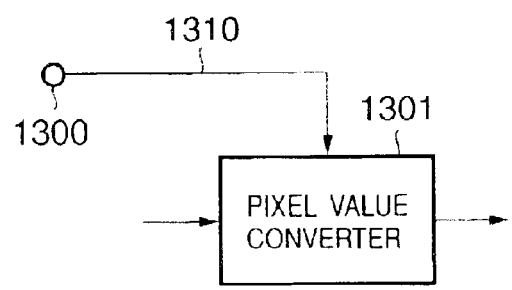

FIGS. 13A and 13B are block diagrams showing principal constituent elements of the image processing apparatus according to the sixth embodiment of the present invention.

In FIGS. 13A and 13B, numeral 1300 denotes an input terminal for inputting a dot control signal 1310 to control dot control processing; numeral 1301 in FIG. 13B denotes a pixel value converter which performs the pixel value conversion as described in the above embodiments as in the case of the pixel value converter 101; and numeral 1302 in FIG. 13A denotes a dot controller which performs the dot arrangement control as that by the above-described dot controller 103. The dot control signal 1310 inputted from the input terminal 1300 is inputted into the dot controller 1302 in FIG. 13A and the pixel value converter 1301 in FIG. 13B, and the contents of the dot control processing and pixel value conversion processing are determined.

That is, in the pixel value converter 1301, any one of the pixel value conversion processings in the above embodiments described in FIGS. 5, 7, 9, 11A and 11B is performed in correspondence with the dot control signal 1310. Note that the pixel value conversion may be performed based on a previously determined method, in other hand, the conversion may be selectively performed in correspondence with the dot control signal 1310.

Further, if the dot control signal 1301 indicates that the dot control processing is not to be performed, an output pixel value may be determined in accordance with the input/output relation indicated by the line 400 in FIGS. 5, 7, 9, 11A or 11B. Otherwise, if the dot control signal 1301 indicates that the dot control processing is not to be performed, it may be arranged such that the pixel value conversion is not performed.

Further, the pixel value converter 1301 performs processing in any one of positions 803 to 806 in FIG. 13A. The position of the processing by the pixel value converter 13101 may be previously determined in correspondence with processing system, or may be predetermined in correspondence with the input dot control signal 1310. Note that if the position of execution of the processing by the pixel value converter 1301 is changed in correspondence with the dot control signal 1310, it may be arranged such that the construction in FIG. 13B is inserted in all the possible positions of the positions 803 to 806 in FIG. 13A, and the inserted pixel value converter 1301 performs the processing in accordance with necessity.

Next, the dot controller 1302 performs the dot control processing in correspondence with the dot control signal 1310. If the position of the pixel value conversion processing is changed in correspondence with the dot control signal 1310 as described above, the upper limit value or the lower limit value of the pixel value inputted into the dot controller 1302 may be changed. Accordingly, it may be arranged such that the dot control is performed in correspondence with the dot control signal 1310 and the dot control is performed so as to sufficiently obtain desired advantages even at the upper limit value or the lower limit value of the input pixel value. Note that it may be arranged such that if the dot control signal 1310 indicates that the dot control processing is not performed, the dot control processing is not performed.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) holding software program code for performing the functions of the above-described embodiments to a system or an apparatus, reading the program code with a computer (e.g., CPU, MPU) of the system or apparatus from the storage medium, then executing the program. In this case, the program code read from the storage medium realizes the functions according to the embodiments, and the storage medium holding the program code constitutes the invention. Furthermore, besides aforesaid functions according to the above embodiments are realized by executing the program code which is read by a computer, the present invention includes a case where an operating system (OS) or the like working on the computer performs a part or entire actual processing in accordance with designations of the program code and realizes the functions according to the above embodiments.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiment.

Note that the above embodiments have been described individually, however, these embodiments may be appropriately combined and performed.

Further, in the above embodiments, the input pixel value is converted to the output pixel value based on the expression representing a straight line or a curve, however, the present invention is not limited to this conversion. For example, these conversion values may be stored in the look-up table format, and the input pixel value may be converted to the output pixel value by referring to the look-up table.

As described above, according to the present invention, an image density region where the dot control is difficult in quantized image data can be eliminated. As a result, the advantages by the dot position control on pseudo-halftone image information can be obtained in any region of the image information in a stable manner. The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
   pixel value conversion means for converting an input pixel value of a pixel around a pixel having a maximum value or a minimum value of input image information to a predetermined pixel value, wherein the maximum value and the minimum value are respectively the maximum and minimum values of a range of the input pixel value;
   quantization means for quantizing the pixel value of a pixel of interest of the image information converted by said pixel value conversion means; and
   dot position arrangement control means for controlling a dot position arrangement for forming an image corresponding to the image information quantized by said quantization means so as to form a predetermined dot pattern in the image represented by the image information.

2. An image processing apparatus according to claim 1, wherein the image information is color image information, and wherein said pixel value conversion means converts each input pixel value of each color component to a pixel value within a predetermined range.

3. An image processing apparatus according to claim 1, wherein said pixel value conversion means changes pixel value conversion processing in correspondence with dot position arrangement control by said dot position arrangement control means.

4. An image processing apparatus comprising:
pixel value conversion means for converting the minimum value and the maximum value of the input pixel value of input image information to a first predetermined value and a second predetermined value, respectively, and linearly converts other pixel values of the input image information along a straight line defined by the first and second predetermined values and the maximum and minimum values;
quantization means for quantizing the pixel value of a pixel of interest of the image information converted by said pixel value conversion means; and
dot arrangement control means for controlling a dot arrangement for forming an image corresponding to the image information quantized by said quantization means so as to form a predetermined dot pattern in the image represented by the image information.

5. An image processing apparatus according to claim 4, wherein a combination of the first and second predetermined values converted by said pixel value conversion means is a combination of colors representing achromatic colors.

6. An image processing apparatus comprising:
pixel value conversion means for segmenting an input range of the input pixel values of image information into a plurality of ranges, and converts the input pixel values in correspondence with a predetermined conversion coefficient by each input range;
quantization means for quantizing the pixel value of a pixel of interest of the image information converted by said pixel value conversion means; and
dot arrangement control means for controlling a dot arrangement for forming an image corresponding to the image information quantized by said quantization means so as to form a predetermined dot pattern in the image represented by the image information.

7. An image processing apparatus comprising:
pixel value conversion means for converting the minimum value and the maximum value of an input pixel value of image information to a first predetermined value and a second predetermined value, respectively, and nonlinearly converts other input pixel values along a curve defined between the first and second predetermined values and the maximum and minimum values;
quantization means for quantizing the pixel value of a pixel of interest of the image information converted by said pixel value conversion means; and
dot arrangement control means for controlling a dot arrangement for forming an image corresponding to the image information quantized by said quantization means so as to form a predetermined dot pattern in the image represented by the image information.

8. An image processing method comprising:
a pixel value conversion step, of converting an input pixel value of a pixel around a pixel having a maximum value or a minimum value of input image data to a predetermined a pixel value, wherein the maximum value and the minimum value are respectively the maximum and minimum values of a range of the input pixel value;
a quantization step, of quantizing the pixel value of a pixel of interest of image data converted in said pixel value conversion step; and
a dot arrangement control step, of controlling a dot arrangement for forming an image corresponding to the image data quantized in said quantization step so as to form a predetermined dot pattern in the image represented by the image data.

9. An image processing method according to claim 8, wherein the image data is color image data, and wherein in said pixel value conversion step, each pixel value of each color component is converted to a pixel value within a predetermined range.

10. An image processing method according to claim 8, wherein in said pixel value conversion step, pixel value conversion processing is changed in correspondence with the dot arrangement control performed in said dot arrangement control step.

11. A computer-readable storage medium storing a program for performing the image processing method according to claim 8.

12. A program for performing the image processing method according to claim 8.

13. An image processing method comprising:
a pixel value conversion step, of converting the minimum value and the maximum value of an input pixel value of image data to a first predetermined value and a second predetermined value, respectively, and linearly converting other pixel values along a straight line defined by the first and second predetermined values and the maximum and minimum values;
a quantization step, of quantizing the pixel value of a pixel of interest of image data converted in said pixel value conversion step; and
a dot arrangement control step, of controlling a dot arrangement for forming an image corresponding to the image data quantized in said quantization step so as to form a predetermined dot pattern in the image represented by the image data.

14. An image processing apparatus according to claim 13, wherein a combination of the first and second predetermined values converted in said pixel value conversion step is a combination of colors representing achromatic colors.

15. An image processing method comprising:
a pixel value conversion step, of segmenting a range of input pixel values of image data into a plurality of ranges, and converting the input pixel value in correspondence with a predetermined conversion coefficient by each range;
a quantization step, of quantizing the pixel value of a pixel of interest of image data converted in said pixel value conversion step; and
a dot arrangement control step, of controlling a dot arrangement for forming an image corresponding to the image data quantized in said quantization step so as to form a predetermined dot pattern in the image represented by the image data.

16. An image processing method comprising:
a pixel value conversion step, of converting the minimum value and the maximum value of an input pixel value of image data to a first predetermined value and a second predetermined value, respectively, and nonlinearly converting other pixel values along a curve defined between the first and second predetermined values and the maximum and minimum values;
a quantization step, of quantizing the pixel value of a pixel of interest of image data converted in said pixel value conversion step; and
a dot arrangement control step, of controlling a dot arrangement for forming an image corresponding to the image data quantized in said quantization step so as to form a predetermined dot pattern in the image represented by the image data.

* * * * *